United States Patent [19]

Tice

[11] Patent Number: 5,643,073
[45] Date of Patent: Jul. 1, 1997

[54] SKINNING APPARATUS

[76] Inventor: Hugh J. Tice, 414 Buckhorn Tr., Hamilton, Ala. 35570

[21] Appl. No.: 615,335

[22] Filed: Mar. 11, 1996

[51] Int. Cl.$^6$ ........................................... A22B 5/16
[52] U.S. Cl. .................................................. 452/125
[58] Field of Search .............................. 452/125, 128, 452/132, 187

[56] References Cited

U.S. PATENT DOCUMENTS

| | | | |
|---|---|---|---|
| 3,789,458 | 2/1974 | Brown | 17/21 |
| 4,317,257 | 3/1982 | Engel | 452/187 |
| 4,529,240 | 7/1985 | Engel | 294/141 |
| 5,211,601 | 5/1993 | Cope | 452/187 |
| 5,336,124 | 8/1994 | Garside | 452/125 |
| 5,336,129 | 8/1994 | Frith | 452/187 |
| 5,482,501 | 1/1996 | Frits | 452/125 |

FOREIGN PATENT DOCUMENTS

| | | | |
|---|---|---|---|
| 249881 | 8/1912 | Germany | 452/125 |
| 634576 | 8/1936 | Germany | 452/125 |

*Primary Examiner*—Willis Little
*Attorney, Agent, or Firm*—John D. Gugliotta; David L. Volk

[57] ABSTRACT

A skinning apparatus is provided which is constructed of durable metal and consists of a flat back plate segment and a plate key insert containing a slot. On the back plate segment are a first aperture situated over a second aperture. The first aperture is a circular hole, and is intended to be affixed to a cable or chain attached to a truck or other vehicle. The second aperture is a key-shaped hole and forms the orifice through which the hide of the animal will be inserted. Once the skin of the game is pushed through the slot in the plate key insert, the skin is wrapped and folded about the plate key insert and inserted through the second aperture. The skin is then secured by locking the plate key insert within the second aperture.

4 Claims, 2 Drawing Sheets

SKINNING APPARATUS

BACKGROUND OF THE INVENTION

1. Field of the Invention

The present invention relates generally to devices for removing the hides from game animals, and particularly for skinning deer.

2. Description of the Related Art

As is well-known in the art, many methods and apparatus are available for aiding in the removal of animal hides. For example, in U.S. Pat. No. 5,336,124, issued in the name of Garside, a horizontal skinning and protecting method is disclosed utilizing an enclosable game bag for containing and protecting a skinned animal.

Also, in U.S. Pat. No. 5,211,601, issued in the name of Cope, a mechanical deer skinning device is disclosed having a self supporting means for holding a white-tail deer or other game animal of similar size.

Further, in U.S. Pat. No. 4,317,257, issued in the name of Engel, an animal carrying and skinning device is disclosed utilizing an elongated cable which can be pulled by a power device to strip the skin from an animal carcass.

Although these and many other methods can be effective in removing the hide of an animal, a need remains for a device which can be used to aid in the removal of hide from a deer or similar game quickly and easily at the site where the carcass is located.

SUMMARY OF THE INVENTION

It is therefore an object of the present invention to provide an improved animal skinning apparatus.

It is a feature of the present invention to provide an improved animal skinning apparatus which can facilitate quick and easy skinning of a deer at the site of the carcass.

Briefly described according to one embodiment of the present invention, a skinning apparatus is provided which is constructed of durable metal and consists of a flat back plate segment and a plate key insert containing a slot. On the back plate segment are a first aperture situated over a second aperture. The first aperture is a circular hole, and is intended to be affixed to a cable or chain attached to a truck or other vehicle. The second aperture is a key-shaped hole and forms the orifice through which the hide of the animal will be inserted. Once the skin of the game is pushed through the slot in the plate key insert, the skin is wrapped about the plate key insert and inserted through the second aperture. The skin is then secured by sliding the skin into a narrow portion of the second aperture.

An advantage of the present invention is that a game animal may be skinned at the site of the carcass, the skinning apparatus being small enough to carry anywhere.

Further, a preferred embodiment of the present invention can be adapted for use with a motor vehicle, a winch, or any other method of provide a pulling force.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
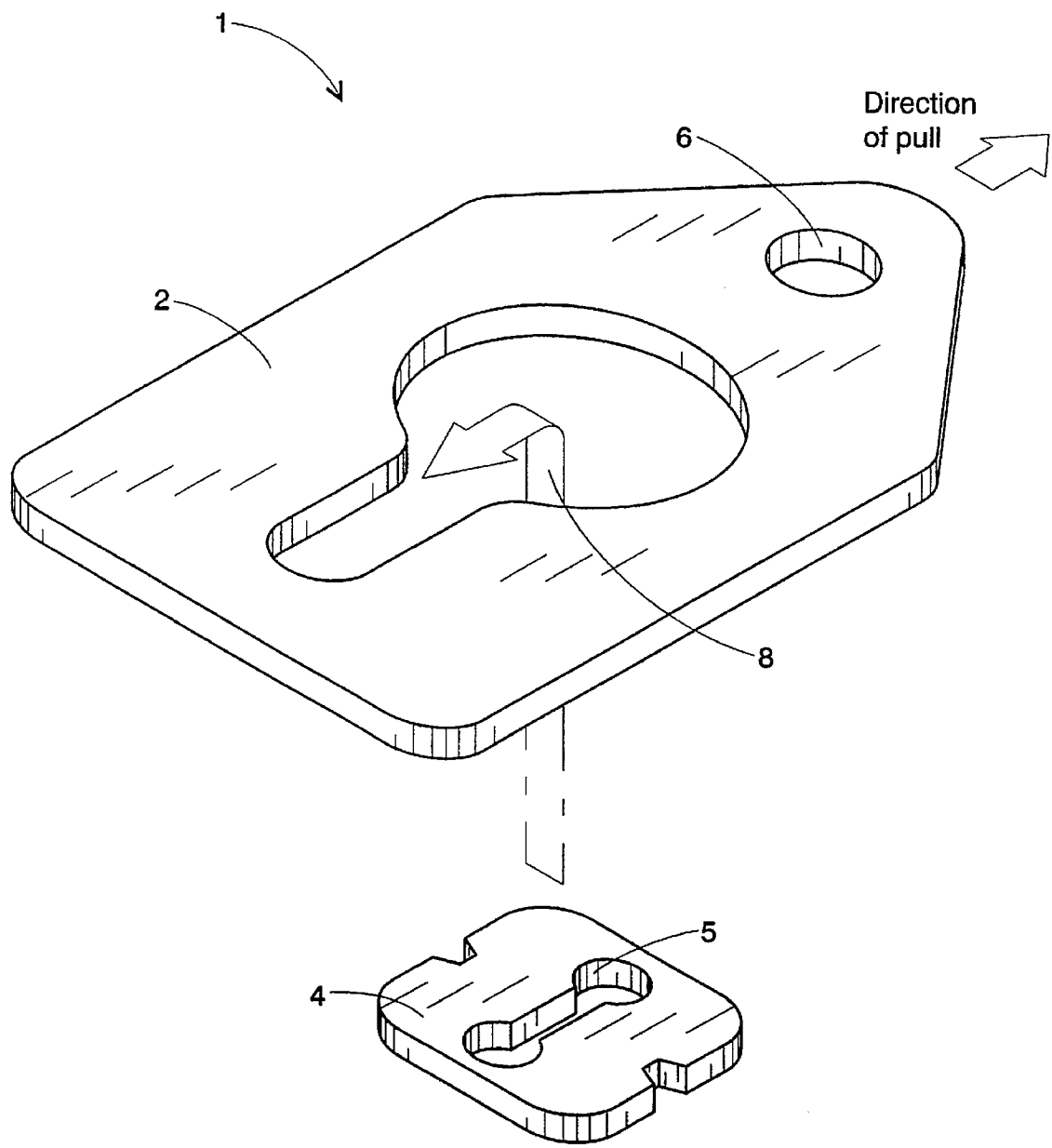
FIG. 1 is a perspective view of the preferred embodiment of the present invention.

Referring now to FIG. 1, a skinning apparatus I is shown, according to the present invention, comprised of flat back plate segment 2 and a plate key insert 4 containing a slot 5. In its preferred embodiment it is envisioned that both the flat back plate segment 2 and the plate key insert 4 are each constructed of durable metal, and can be made of approximately 1/8 inch thick plate steel. On the back plate segment 2 are a first aperture 6 situated over a second aperture 8. The first aperture 6 is a circular hole, and is intended to be affixed to a cable or chain attached to a truck or other vehicle. The second aperture 8 is a key-shaped hole having a wide portion 8A and a narrow portion 8B inserted. Once the skin of the game is pushed through wide portion 8A of the slot 5 in the plate key insert 4, the skin is wrapped and folded about the plate key insert 4 and inserted through the second aperture 8. The skin is then secured by sliding the skin into the narrow portion 8B of the second aperture 8.

2. Operation of the Preferred Embodiment

Figure 2:
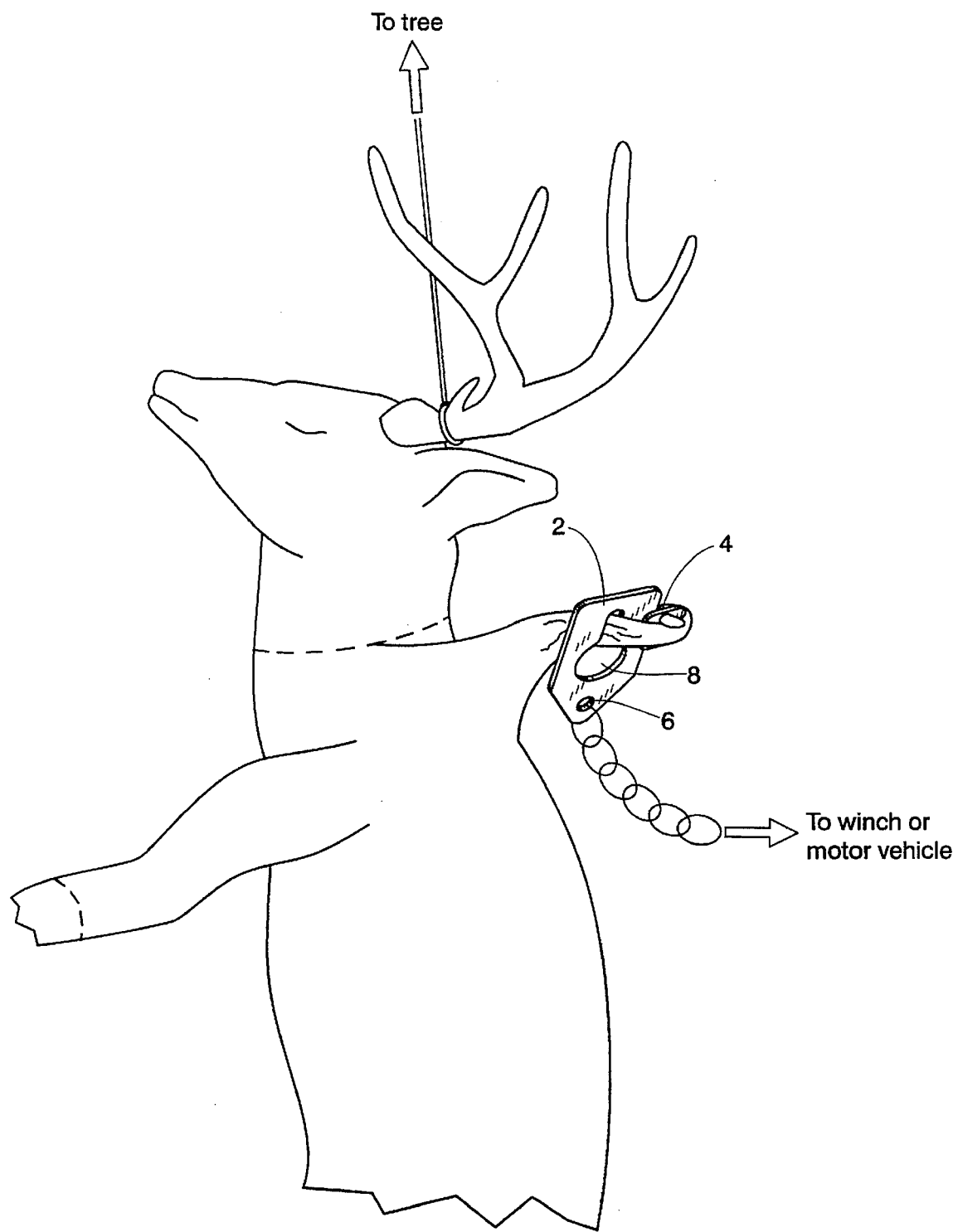
FIG. 2 is a pictorial view of the present invention being utilized in skinning a deer.

Referring to FIG. 2, to employ the present invention, the hunter may suspend the game by its neck or hind legs and cuts the skin of the animal in a pattern which facilitates removal of the skin, such as around the neck, down the front legs from underneath where the legs join the body (down to the feet), and around the feet front and back. Enough skin must be pulled from behind the neck in order to provide a starting point for the skinning apparatus. Next, the user may insert the cable, which extends from a truck or motor vehicle, into the circular first aperture 6 of the back plate segment 2. Then, the user inserts the skin from the starting point into the slot 5 of the plate key insert 4. The plate key insert 4 is then passed into the wide portion 8A of the key-shaped second aperture 8. Next, the hunter wraps the hide around the plate key insert 4 and slides the skin into the narrow portion 8B of the second aperture 8. Once this process has been completed, the user may then commence movement of his vehicle. This action will quickly pull the hide away from the body.

As an alternative to using the plate key insert 4, the user may pass the skin through the wide portion 8A of the second aperture 8, then wrap the skin around a pipe (not shown), then secure the skin by sliding the skin into the narrow portion 8B of the second aperture 8.

The foregoing description is included to illustrate the operation of the preferred embodiment and is not meant to limit the scope of the invention. The scope of the invention is to be limited only by the following claims.

What is claimed is:

1. A skinning apparatus for aiding in the removal of a hide from the carcass of a game animal, said skinning apparatus comprising:

a back plate segment, said back plate segment being generally flat;

a first aperture formed within said back plate, said first aperture being a circular hole;

a second aperture formed within said back plate and situated under said first aperture, said second aperture being a key-shaped hole and forming the orifice through which the hide of the animal can be inserted;

a plate key insert being generally flat and being passable through said second aperture; and a slot formed within said plate key insert for receiving a section of animal hide.

2. The skinning apparatus as described in claim 1, wherein said back plate segment is formed from a single piece of flat metal plate.

3. The skinning apparatus as described in claim 1, wherein said plate key insert is formed from a single piece of flat metal plate.

4. A method for removing the skin of a game animal utilizing the skinning apparatus as described in claim 1, the steps including:

suspending the game by its neck or hind legs;

cutting the skin of the animal in a pattern which facilitates removal of the skin;

preparing a starting point formed of a flap of skin located near the neck of the game animal;

connecting a cable or rope between a motor vehicle and the circular first aperture of the back plate segment;

inserting the skin from the starting point into the slot of the plate key insert;

wrapping the inserted skin from the starting point around the plate key insert;

passing the wrapped skin into and through a wide portion of the key-shaped second aperture;

securing the skin by sliding the skin into a narrow portion of the second aperture; and removing the skin by applying force from the motor vehicle.

\* \* \* \* \*